(12) United States Patent
Murphy

(10) Patent No.: US 7,311,057 B2
(45) Date of Patent: Dec. 25, 2007

(54) SURFACE EFFECT CRAFT

(76) Inventor: David Murphy, 4438 Ashby Road P.O. Box 738, Prescott (CA) K0E 1T0

( * ) Notice: Subject to any disclaimer, the term of this patent is extended or adjusted under 35 U.S.C. 154(b) by 0 days.

(21) Appl. No.: 11/153,476

(22) Filed: Jun. 16, 2005

(65) Prior Publication Data

US 2006/0009093 A1    Jan. 12, 2006

Related U.S. Application Data

(60) Provisional application No. 60/579,644, filed on Jun. 16, 2004.

(51) Int. Cl.
*B63B 1/16* (2006.01)

(52) U.S. Cl. ........................ 114/272; 180/126

(58) Field of Classification Search ............. 114/272, 114/273, 288–29, 293; 180/116–120, 126
See application file for complete search history.

(56) References Cited

U.S. PATENT DOCUMENTS

| | | | | |
|---|---|---|---|---|
| 3,141,436 | A | * | 7/1964 | Cathers et al. ............. 180/120 |
| 3,146,752 | A | * | 9/1964 | Ford ........................ 114/67 A |
| 3,288,236 | A | * | 11/1966 | Padial ....................... 180/126 |
| 3,390,655 | A | * | 7/1968 | Quady et al. ................ 114/1 |
| 3,530,815 | A | * | 9/1970 | Lewison .................... 114/280 |
| 3,799,095 | A | | 3/1974 | Bertin |
| 4,046,338 | A | | 9/1977 | Kline et al. |
| 4,422,517 | A | * | 12/1983 | Hammerschlag ........... 180/127 |
| 5,769,021 | A | * | 6/1998 | Schad ....................... 440/12.5 |
| 5,769,517 | A | * | 6/1998 | Carde ........................ 312/333 |
| 5,787,828 | A | * | 8/1998 | Barbier et al. ............. 114/61.1 |
| 6,058,872 | A | | 5/2000 | Latorre |
| 6,148,757 | A | | 11/2000 | Schulte |
| 6,325,011 | B1 | | 12/2001 | Klem |
| 6,581,536 | B1 | | 6/2003 | Belloso |

FOREIGN PATENT DOCUMENTS

CA    2199557    11/1997

* cited by examiner

*Primary Examiner*—Ed Swinehart
(74) *Attorney, Agent, or Firm*—Freedman & Associates

(57) ABSTRACT

The present invention relates to a surface effect craft comprising a supporting deck structure having two pontoons mounted thereto in catamaran like fashion. A propulsion mechanism is mounted to a rear portion of the deck structure. A lift control member is disposed under the deck structure between the two pontoons. The lift control member is pivotally movable mounted to the front portion of the deck structure. A lift adjust mechanism pivotally moves the lift control member between a first position with the rear end of the lift control member being in close proximity to the surface and a second position with the rear end of the lift control member being in close proximity to the deck structure. Employment of the lift control member enables the craft to achieve surface effect at low speed and, furthermore, allows control of the aerodynamic lift in a wide range from maximum lift to negative lift. This substantially widens the range of surface conditions and speed the craft is operable, such as uneven ground, choppy water surfaces, snow, and ice.

27 Claims, 14 Drawing Sheets

SURFACE EFFECT CRAFT

This application claims benefit from U.S. Provisional Patent Application No. 60/579,644 filed Jun. 16, 2004.

FIELD OF THE INVENTION

This invention relates to surface effect crafts and in particular to a surface effect craft capable of adjusting aerodynamic lift in a wide operational range.

BACKGROUND OF THE INVENTION

Airboats have long been used for travel upon swamps and other shallow bodies of water. Such boats are generally catamaran like structures having two hulls or pontoons, and are equipped with aircraft type propulsion such as an air fan propeller located on the deck of the boat. This design enables the airboat to travel in shallow waters that are not navigable by vessels having a conventional immersed propeller. U.S. Pat. No. 6,148,757 discloses an airboat having the catamaran hulls designed for guiding water outward and under the hulls to move contact of the hulls with the water surface aft. This decreases hull drag and increases lift at higher speeds. However, the lift is only variable by changing the speed of the airboat. An airboat of this design requires a long distance to achieve higher speeds and is restricted for travel over smooth surfaces, i.e. mostly water surfaces.

Other types of air-driven boats include aerodynamic surface effect vessels, which with forward motion, develop a ram air lifting force by funneling and compressing a high velocity air stream within a channel defined by at least two hulls, a deck and water surface, as disclosed, for example, in U.S. Pat. Nos. 3,799,095 and 6,058,872. The surface effect lift is capable of raising a vessel a relatively small distance above an underlying substantially flat surface at higher speeds. U.S. Pat. Nos. 6,325,011 and 6,581,536 disclose high-speed air-supported crafts capable of operating as both a water-contacting craft and a wing in ground effect aircraft. However, these crafts require relatively long distances of a smooth surface such as a calm water surface in order to achieve the high speeds necessary for providing lift. Therefore, employment of such crafts is limited to situations where a calm water surface or a runway is available rendering them unsuitable for employment in numerous situations.

In order to overcome this limitation U.S. Pat. No. 5,464,069 describes an air-driven craft that combines aerodynamic lift with a hovercraft effect. In said hovercraft effect powerful fans produce an aircushion under the craft without forward motion for lifting the craft off the surface. However, the additional mechanism for generating the aircushion substantially increases the complexity as well as size and weight of the craft.

It would be advantageous to provide a surface effect craft that is capable of achieving aerodynamic lift at low speed. It would be further advantageous to provide a surface effect craft capable of adjusting aerodynamic lift in a wide operational range.

SUMMARY OF THE INVENTION

It is, therefore, an object of the invention to provide a surface effect craft that is capable of achieving aerodynamic lift at low speed.

It is further an object of the invention to provide a surface effect craft capable of adjusting aerodynamic lift in a wide operational range.

It is yet further an object of the invention to provide a surface effect craft that is simple in construction, simple to operate and easy to deploy.

In accordance with the present invention there is provided a surface effect craft comprising:

a supporting deck structure;

a propulsion mechanism in mechanical communication with the supporting deck structure for providing forward movement of the surface effect craft;

a first and a second guiding member disposed at a left hand side and a right hand side of the supporting deck structure, respectively, and in mechanical communication therewith, the first and the second guiding member being oriented substantially parallel to a longitudinal axis of the supporting deck structure and extending downward a predetermined distance from a bottom of the supporting deck structure for channeling air under the bottom of the supporting deck structure during forward movement of the surface effect craft;

at least a lift control member disposed under the supporting deck structure between the first and the second guiding member, the at least a lift control member being pivotally movable mounted to a front portion of the supporting deck structure, the at least a lift control member being movable between a first position with the rear end of the lift control member being at a maximum distance to the bottom of the supporting deck structure and a second position with the rear end of the lift control member being at a minimum distance to the bottom of the supporting deck structure for controlling lift acting on the surface effect craft during forward movement; and, a lift adjust mechanism in mechanical communication with the supporting deck structure and the at least a lift control member for pivotally moving the lift control member.

In accordance with an aspect of the present invention there is provided a surface effect craft comprising:

a supporting deck structure;

a floating member disposed at a center of the supporting deck structure and in mechanical communication therewith, the floating member being oriented substantially parallel to a longitudinal axis of the supporting deck structure and extending downward from a bottom of the supporting deck structure;

a propulsion mechanism mounted to a rear portion of the floating member for providing forward movement of the surface effect craft;

a first and a second guiding member disposed at a left hand side and a right hand side of the supporting deck structure, respectively, and in mechanical communication therewith, the first and the second guiding member being oriented substantially parallel to a longitudinal axis of the supporting deck structure and extending downward a predetermined distance from the bottom of the supporting deck structure, the first and the second guiding member for channeling air under a left hand portion and a right hand portion of the bottom of the supporting deck structure, respectively, during forward movement of the surface effect craft;

a first lift control member disposed under the left hand portion of the supporting deck structure between the first guiding member and the floating member and a second lift control member disposed under the right hand portion of the supporting deck structure between the second guiding member and the floating member, the first and the second lift control member being pivotally movable mounted to a front portion of the supporting deck structure, the first and the second lift control member being movable between a first position with the rear end of the lift control member being at a maximum distance to the bottom of the supporting deck structure and a second position with the rear end of the lift control member being at a minimum distance to the bottom of the supporting deck structure for controlling lift acting on the surface effect craft during forward movement; and, a lift adjust mechanism in mechanical communication with the supporting deck structure and the first and the second lift control member for pivotally moving the first and the second lift control member.

In accordance with another aspect of the present invention there is provided a surface effect craft comprising:

a supporting deck structure;

an aerodynamic propulsion mechanism mounted to the supporting deck structure for providing forward movement;

two pontoons mounted to the supporting deck structure in catamaran like fashion;

a tail structure comprising an elevator and a rudder mounted to a rear portion of the deck structure with the elevator being disposed such that an air stream generated by the aerodynamic propulsion mechanism is acting on the same;

a lift control member disposed under the supporting deck structure between the two pontoons, the lift control member being pivotally movable mounted to a front portion of the supporting deck structure, the lift control member being movable between a first position with the rear end of the lift control member being at a maximum distance to the bottom of the supporting deck structure and a second position with the rear end of the lift control member being at a minimum distance to the bottom of the supporting deck structure for controlling lift acting on the surface effect craft during forward movement; and, a lift adjust mechanism in mechanical communication with the supporting deck structure and the lift control member for pivotally moving the lift control member.

In accordance with the present invention there is further provided a method for controlling lift acting on a surface effect craft comprising:

providing forward movement of the surface effect craft;

channeling air under a bottom surface of the surface effect craft during the forward movement;

disposing under the bottom surface of the surface effect craft at least a lift control member, the at least a lift control member being pivotally movable mounted to a front portion of the surface effect craft; and, controlling lift acting on the surface effect craft during forward movement by controllably moving the at least a lift control member between a first position with a rear end of the at least a lift control member being at a maximum distance to the bottom surface of the surface effect craft and a second position with the rear end of the at least a lift control member being at a minimum distance to the bottom surface of the surface effect craft.

BRIEF DESCRIPTION OF THE FIGURES

Exemplary embodiments of the invention will now be described in conjunction with the following drawings, in which.

DETAILED DESCRIPTION OF THE INVENTION

Figure 1A:
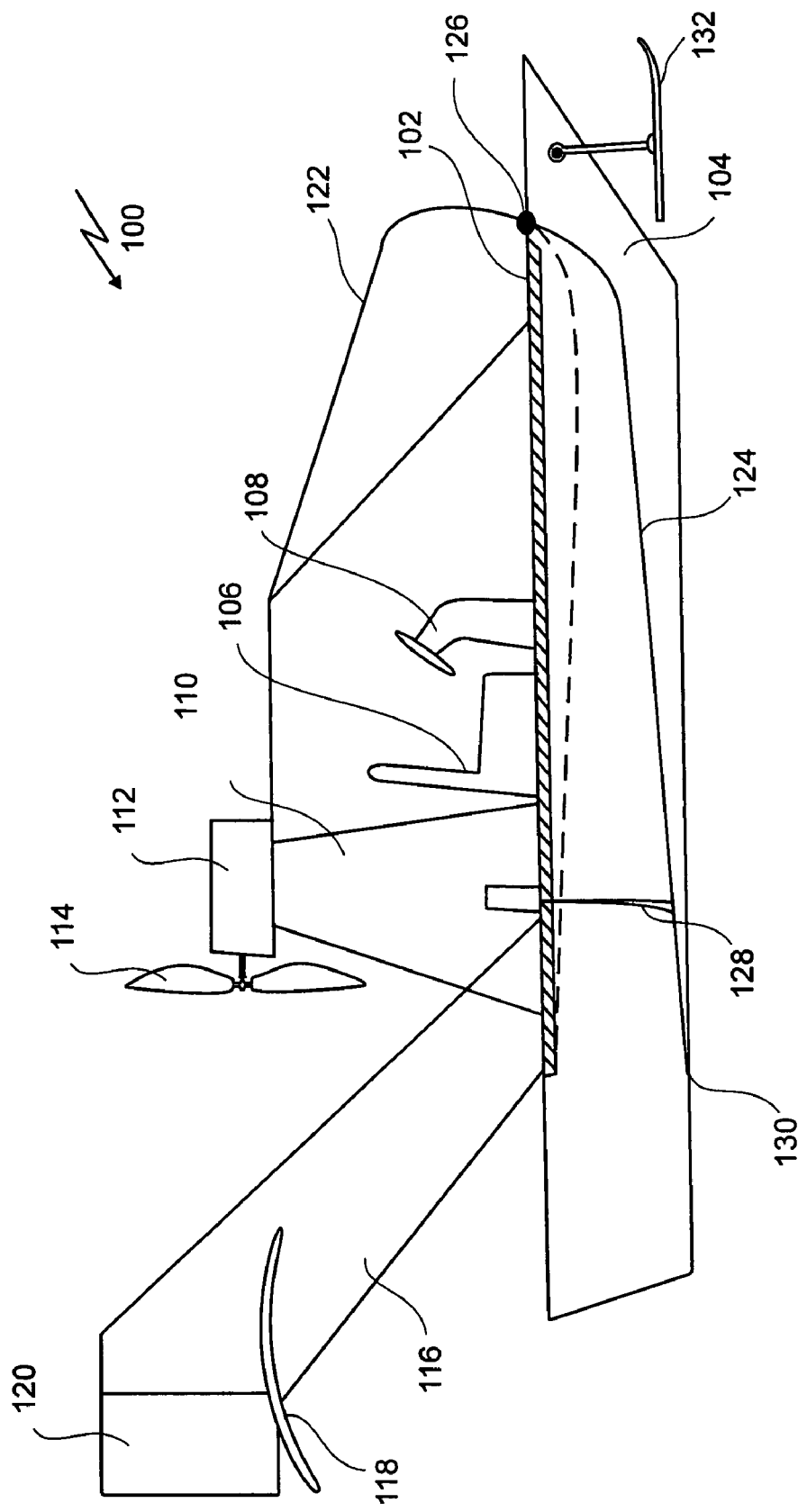
FIGS. 1a and 1b are simplified block diagrams schematically illustrating a cross sectional side view and a front view, respectively, of an amphibious surface effect craft according to an embodiment of the invention.
Figure 1B:
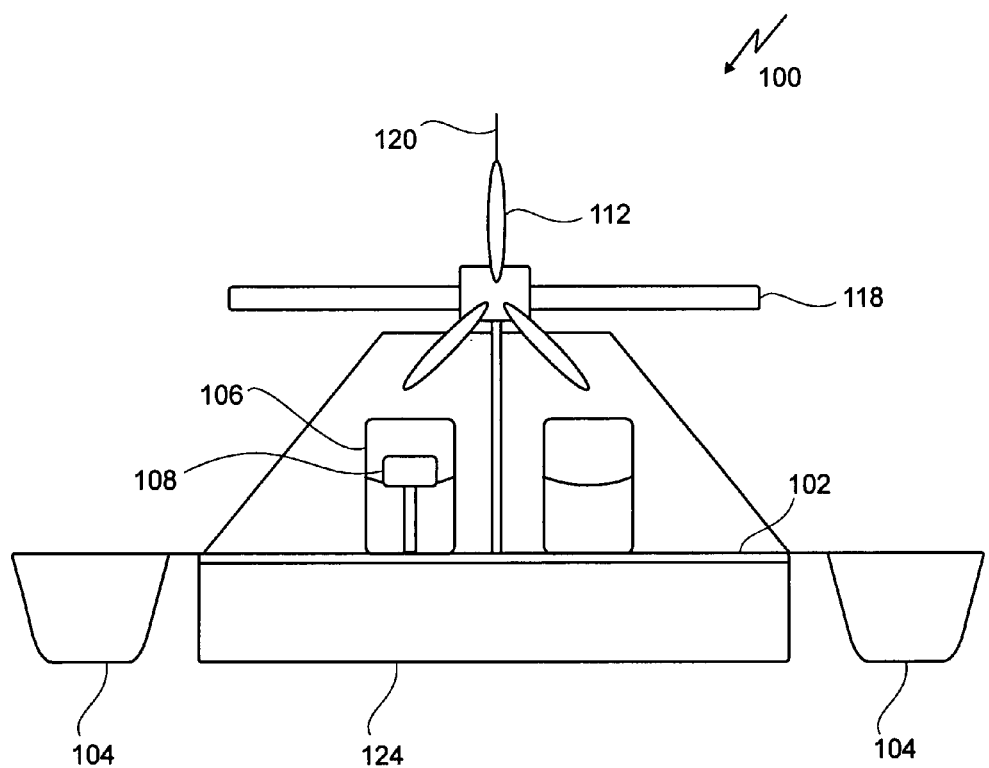

Referring to FIGS. 1a and 1b, a cross-sectional view and a front view of a preferred embodiment of a surface effect craft 100 according to an embodiment of the invention is shown. The surface effect craft 100 comprises a supporting deck structure 102 connecting two pontoons 104 in a catamaran like fashion. The deck structure 102 comprises seating 106 for a pilot, controls 108, and, optionally, further seating for passengers, not shown. Mounted to the rear portion of the deck structure 102 is a propulsion support structure 110 supporting an aerodynamic propulsion mechanism for providing forward propulsion such as a piston engine 112 and a propeller 114. Furthermore, a tail structure 116 comprising elevator 118 and rudder 120 is mounted to the rear portion of the deck structure 102. Canopy 122 mounted to the deck structure 102 provides a protected enclosure for the pilot and passengers. Preferably, the deck structure 102 is extended in the rear such that water or debris is prevented from being drawn into the propeller 112. Alternatively, a protection shield, not shown, is mounted to the rear of the deck structure 102.

Figure 2A:
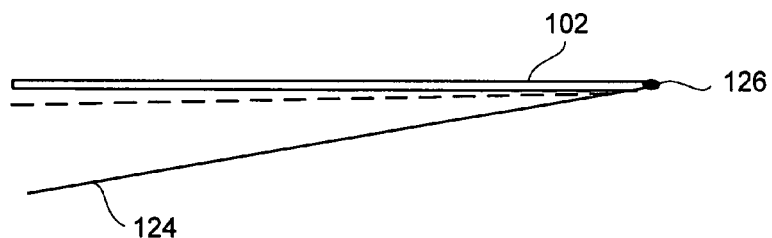
FIGS. 2a to 2e are simplified block diagrams schematically illustrating various embodiments of a lift control member according to an embodiment of the invention.
Figure 2B:
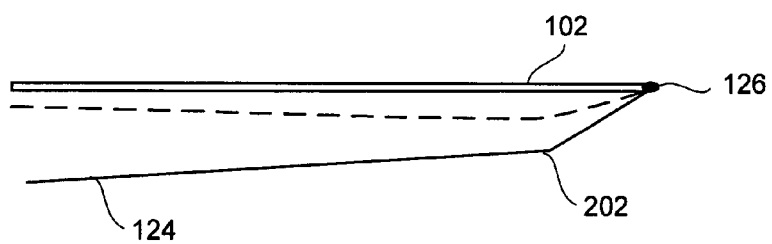
Figure 2C:
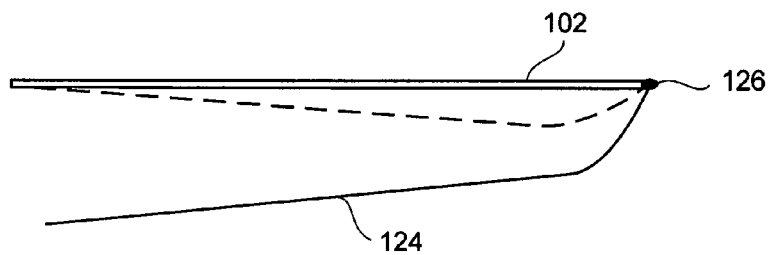
Figure 2D:
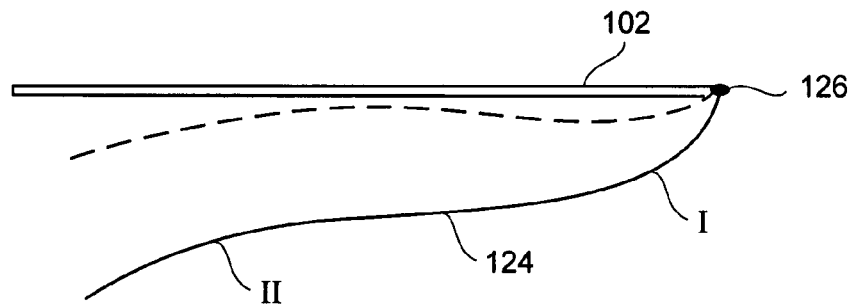
Figure 2E:
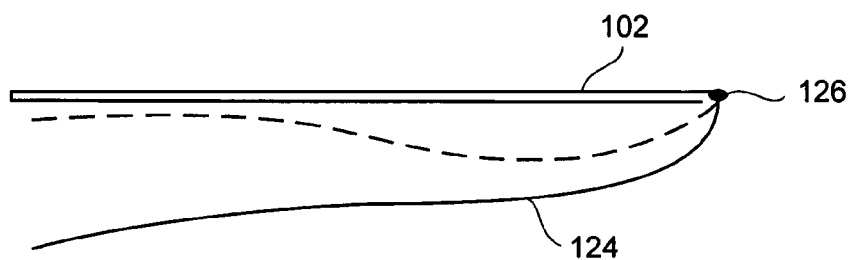

A lift control member 124 is disposed under the deck structure 102 between the pontoons 104 and pivotally mounted to the front portion 126 of the deck structure 102. Preferably, the length of the lift control member 124 is approximately the same as the length of the deck structure 102. The lift control member 124 is movably attached at its rear portion to the deck structure 102 via lift control mechanism 128 such that in operation the lift control member 124 is controllably movable from a first position—with its trailing edge 130 being in close proximity to a ground or water surface—to a second position—with the trailing edge 130 being in close proximity to a bottom surface of the deck structure 102. Referring to FIGS. 2a to 2e, various embodiments of the lift control member 124 according to an embodiment of the invention are shown. The simplest structure of the lift control member 124 comprises a flat plate, shown in FIG. 2a. FIGS. 2b to 2e illustrate embodiments of the lift control member 124 of increasing complexity and increasing performance. The lift control member 124 shown in FIG. 2b comprises two connected flat plates oriented at different angles to the bottom surface of the deck structure 102. Better aerodynamic performance is provided by the lift control member 124 comprising in the front portion a convex curved surface, as shown in FIG. 2c, obviating edge 202 which likely causes flow separation. Performance is further improved by the lift control member 124 shown in FIG. 2d comprising a front portion having a convex curved surface 1 and a rear portion having a concave curved surface 11. The airfoil shaped lift control member 124 illustrated in FIG. 2e provides best performance, i.e. best lift control in various situations and a large speed range of the amphibious craft. However, in order to achieve best performance a complex aerodynamic design process is involved for determining the airfoil shape. Further, manufacture of the airfoil shaped lift control member is more complex and costly compared to the manufacture of the lift control members shown in FIGS. 2a to 2d.

Figure 3A:
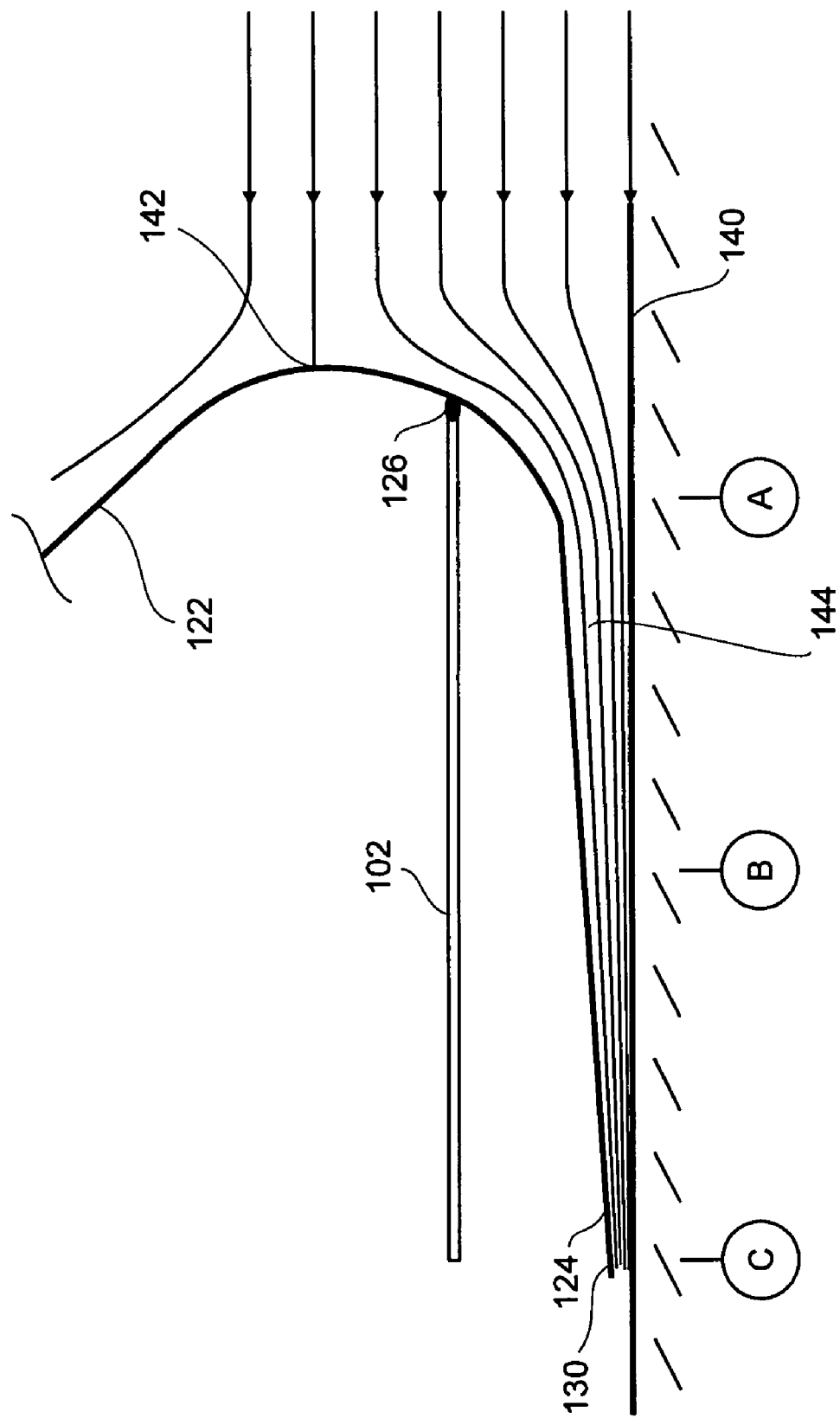
FIGS. 3a to 3c are simplified block diagrams illustrating airflow around a bottom portion of the amphibious surface effect craft according to an embodiment of the invention in three different modes of operation.
Figure 3B:
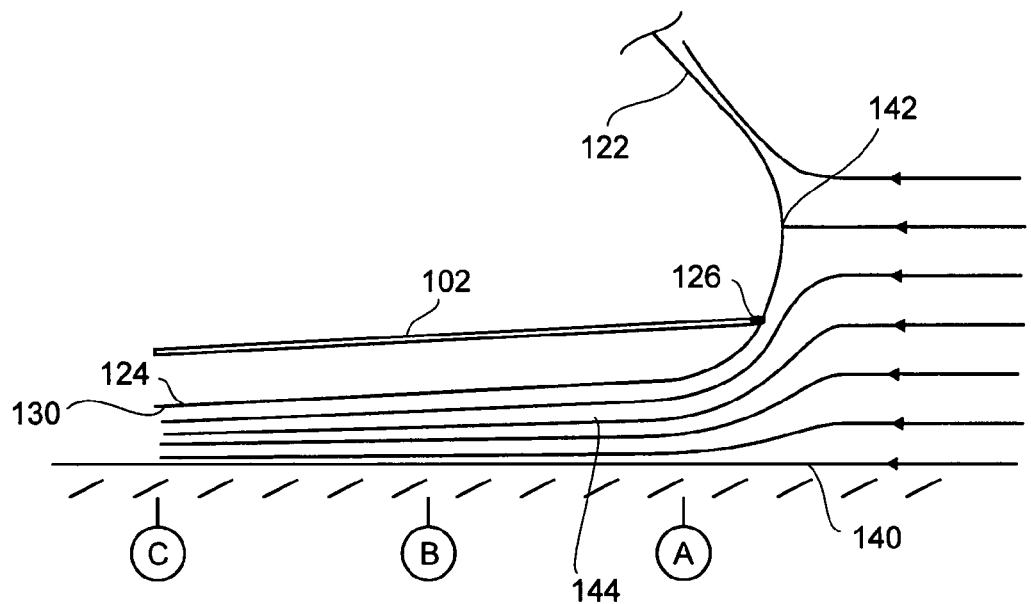
Figure 3C:
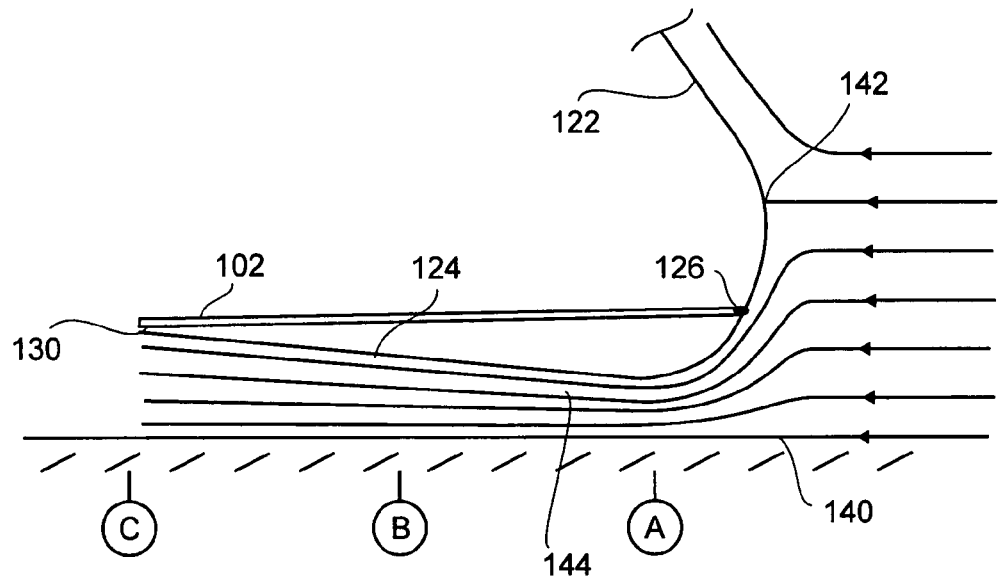

Referring to FIGS. 3a to 3c, three principal modes of operation of the lift control member 124 according to an embodiment of the invention are shown. FIGS. 3a to 3c illustrate schematically in a cross sectional view streamlines indicating airflow around a front section of the canopy 122 and between the lift control member 124 and a surface 140 in a frame of reference associated with the craft 100. In a first mode, the trailing edge 130 of the lift control member 124 is in close proximity with the surface 140. Air impinging on the front of the craft 100 below stagnation point 142 is directed into a channel 144 formed by the lift control member 124, the surface 140, and between the pontoons 104, not shown, as indicated by the streamlines. Decreasing cross sections from location A to C of the channel 144 results in a successive compression of the air flowing therethrough, thus producing maximum lift acting on the lift control member 124. FIG. 3b illustrates the airflow for the lift control member 124 being in a second intermediate mode of operation. Here, the cross section of the channel 144 is decreasing along the front portion of the lift control member 124—location A to location B—and substantially constant thereafter resulting in reduced lift. A third mode of operation of the lift control member 124 is shown in FIG. 3c with the cross section of the channel 144 decreasing along the front portion of the lift control member 124—in proximity of location A—and increasing cross section thereafter—locations B to C. Increasing the cross section results in a decrease of pressure of the air flow reducing lift or even producing negative lift along the rear portion of the lift control member 124.

The lift control member 124 in its various modes of operation is highly advantageous for operating the craft 100. During a starting period of the craft 100 and at low speeds, the lift control member 124 is operated in its first mode producing maximum lift. This enables the craft 100 to "lift off" within a relatively short distance. Optionally, lift is further enhanced by placing the elevator 118 into an airstream produced by the propeller 114 resulting in additional lift acting on the elevator and producing a lift force lifting the rear portion of the craft 100. With increasing speed, operation of the lift control member 124 is gradually changed to the second mode varying the lift by adjusting the distance between the lift control member 124 and the surface 140 using the lift control mechanism 128. With the speed further increased the operation of the lift control member 124 gradually changes to the third mode. In concert with the elevator 118, the lift control member 124 produces lift forces acting on the front and rear portions and a negative lift force acting on the center portion of the craft 100. This enables the pilot to adjust the distance between the craft 100 and the surface 140 within a predetermined range by adjusting the lift control member 124 and the elevator 118. Being able to adjust the distance between the craft 100 and the surface 140 as well as producing negative lift acting on the center portion of the craft 100 substantially increases stability of the craft when operated above uneven ground or choppy water surfaces and in turns, increasing safety.

Optionally, the distance between the craft 100 and the surface 140 is automatically adjusted using at least a sensor 132 for measuring the distance and a controller for automatically adjusting the lift control member 124 and the elevator 118. Sensors for measuring the distance are well known in the art. For example, skis in contact with a water surface are commonly used to adjust lift of hydrofoil watercraft.

Figure 4:
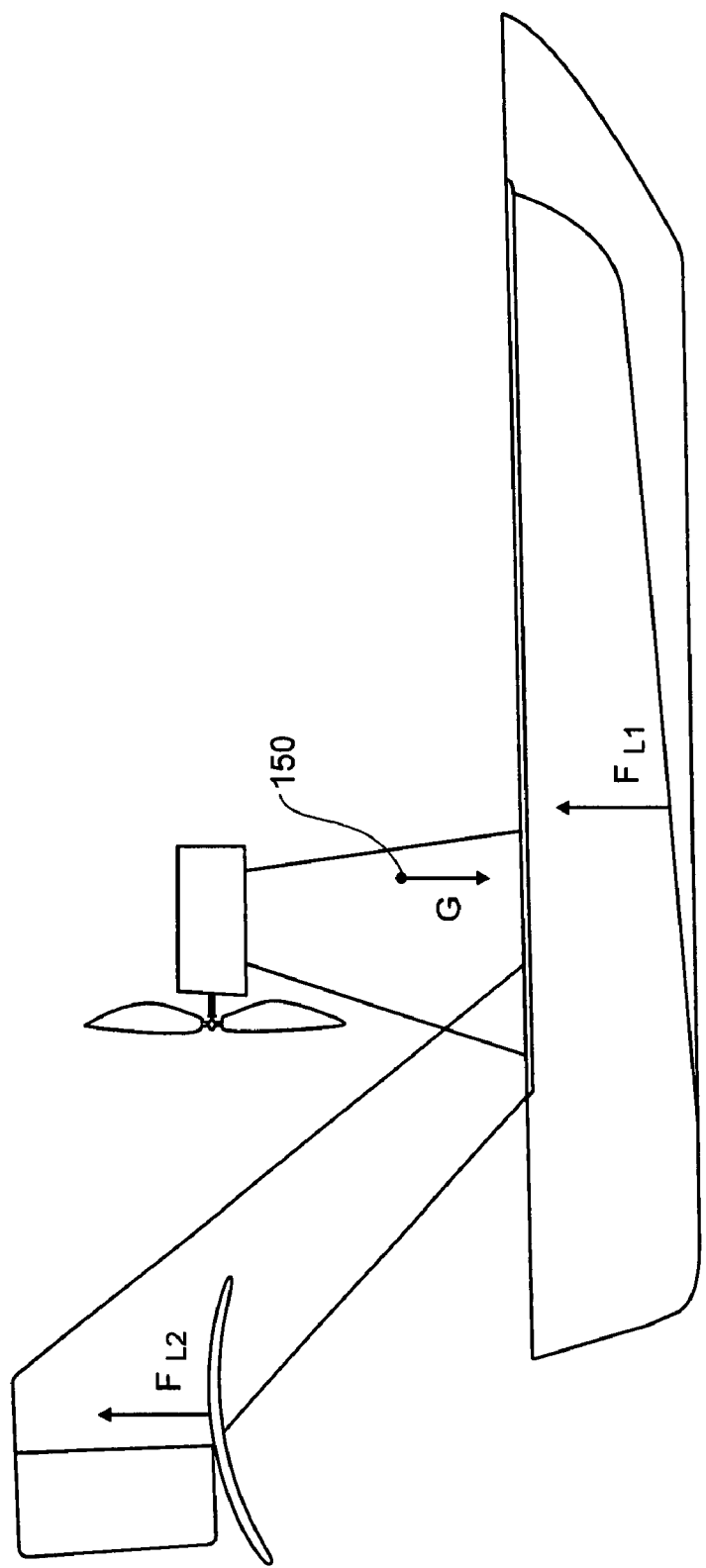
FIG. 4 is a simplified block diagram illustrating forces acting on the amphibious surface effect craft according to an embodiment of the invention.

Preferably, as illustrated in FIG. 4, the lift control member 124 is designed such that a lift force $F_{L1}$ resulting from the lift acting on the lift control member 124 is acting on the craft 100 in front of but in proximity to a vertical projection of its center of mass 150. In concert with the lift force $F_{L2}$ acting on the elevator 118 the lift force $F_{L1}$ balances the gravitational force G of the craft 100. This enables a pilot to optimally control the craft by controlling the lift control member 124 and the elevator 118 over a wide range of surface conditions and speed.

As is evident to one of skill in the art, the shape of the canopy 122—in particular the front portion—has an influence on the performance of the lift control member 124 as well as the overall performance of the craft 100. The design of the canopy 122 is dependent on numerous parameters and, of course, there is a trade-off between optimum performance and practical use such as room for a pilot and passengers. For example, the higher the stagnation point 142 is located above the surface 140 the more air is directed into the channel 144 resulting in increased lift. However, there are limiting factors such as ensuring good visibility for a pilot. Furthermore, shaping sections of the canopy in the form of an airfoil provides additional lift, however, at the cost of substantially reduced space within the enclosure formed by the canopy 122.

Figure 5A:
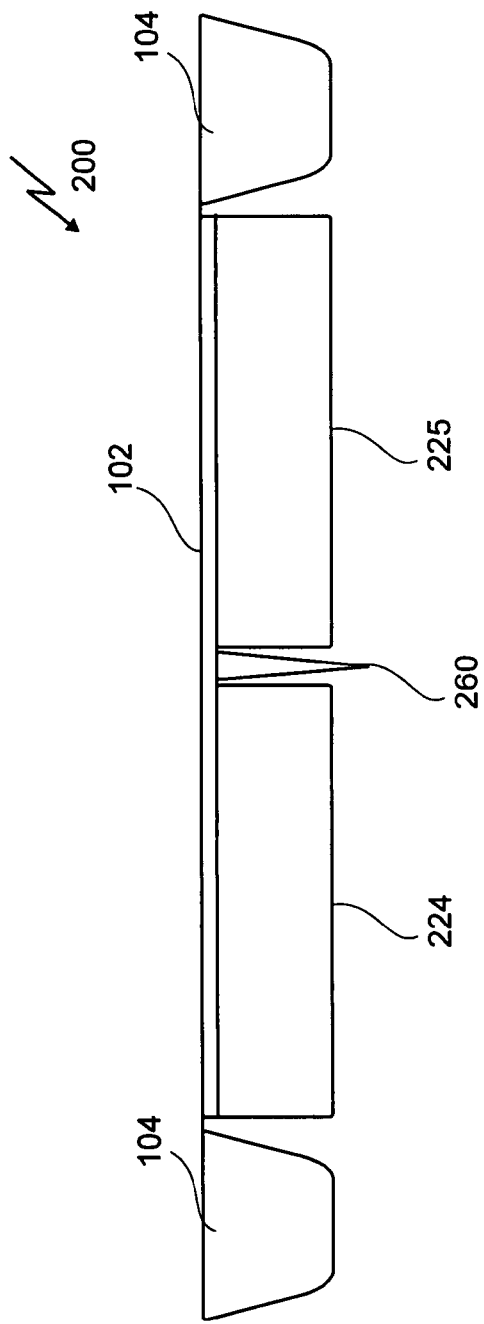
FIGS. 5a and 5b are simplified block diagrams illustrating a front view of two embodiments of the amphibious surface effect craft according to an embodiment of the invention.

Referring to FIG. 5a, a front view of a further preferred embodiment of a surface effect craft 200 according to an embodiment of the invention is shown. In this embodiment, the lift control member 124 is replaced by a left and a right lift control member 224 and 225, respectively. The left and the right lift control member 224 and 225 are independently controllable in order to provide an additional control function to the craft 200 comparable to the function of ailerons in an aircraft. In concert with the elevator 118 and the rudder 120, the left and the right lift control member 224 and 225 enable the pilot to control pitch, yaw, and roll of the craft 200. In particular, combined operation of the left and the right lift control member 224 and 225 with the elevator 118 enable controlling the pitch of the craft 200 as well as the distance to the surface 140. Yaw is controlled using the rudder 120 and roll is controlled by independently moving the left and the right lift control member 224 and 225, resulting in improved steering of the craft 200 through combined control of yaw and roll. Optionally, the airflow along the left and the right lift control member is separated using a separator 260, for example, in the form of a plate.

Figure 5B:
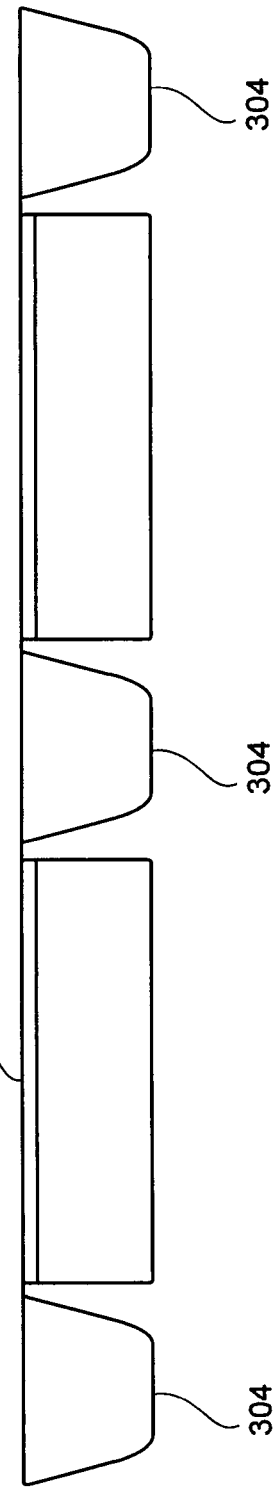

Further optionally, the separator 260 is replaced in the craft 300 by a pontoon 304 resulting in a trimaran like structure, as shown in FIG. 5b.

Figure 6A:
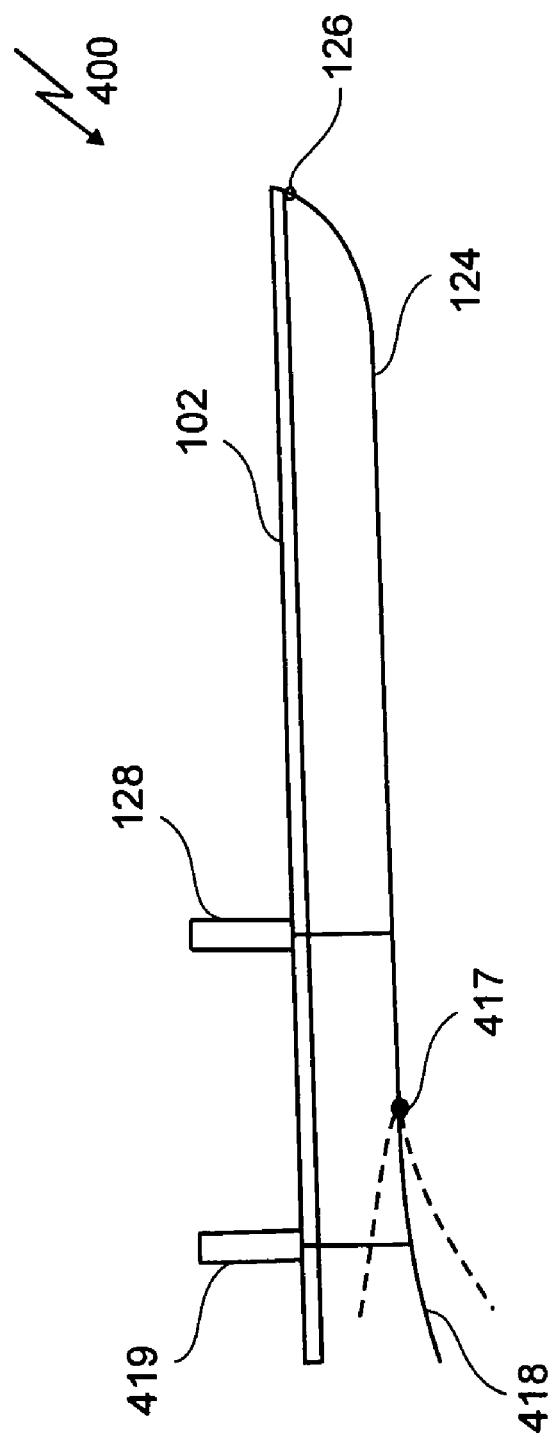
FIGS. 6a to 6c are simplified block diagrams illustrating a further embodiment of the amphibious surface effect craft according to an embodiment of the invention.
Figure 6B:
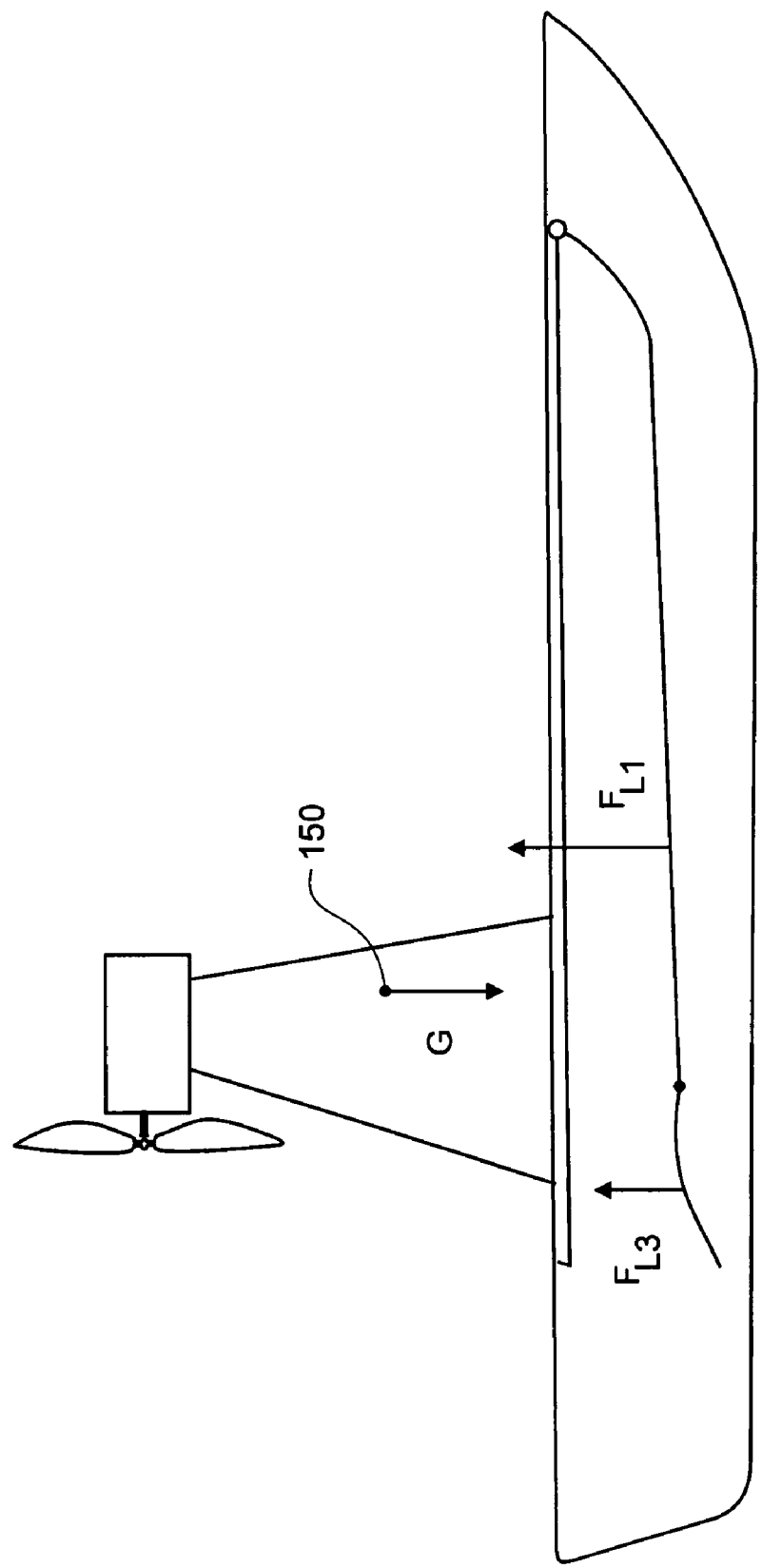
Figure 6C:
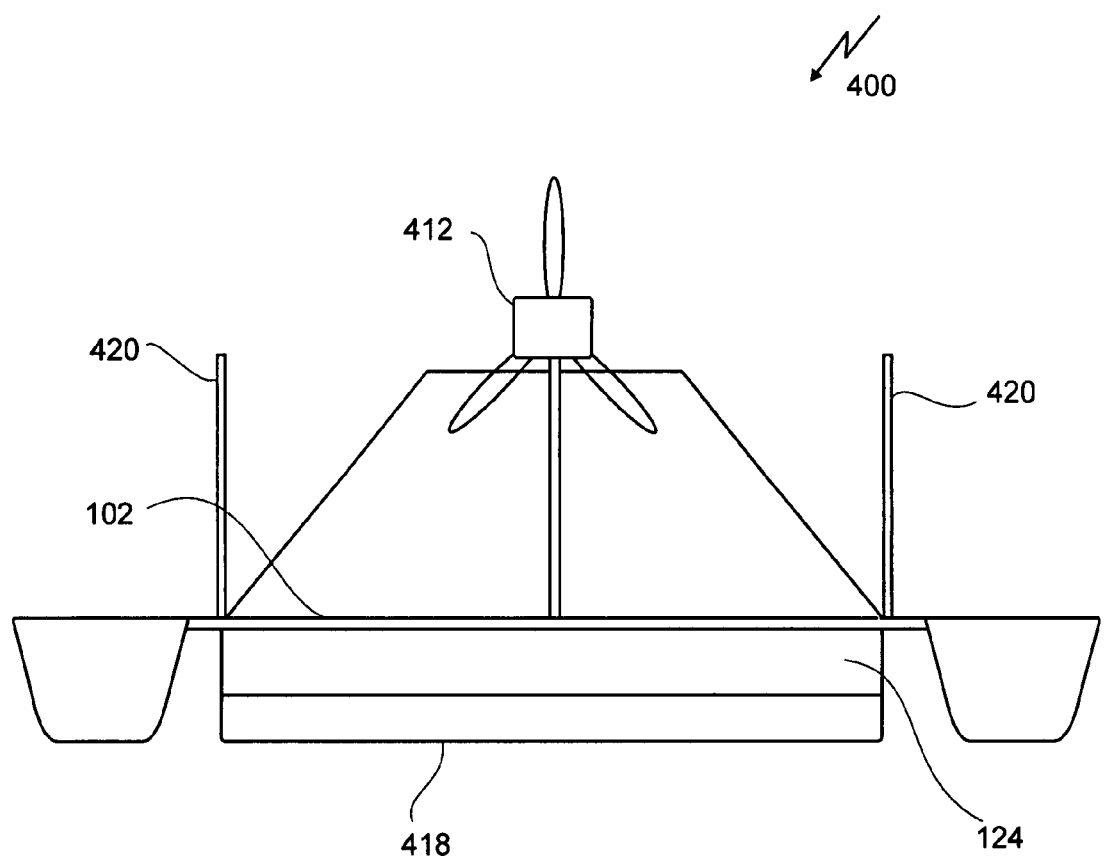

Referring to FIGS. 6a and 6b, a yet further embodiment of a surface effect craft 400 according to an embodiment of the invention is shown. As illustrated in the cross sectional detail of FIG. 6a, the lift control member 124 has at its trailing end a stabilizing element 418 pivotally movable attached thereto. The orientation of the stabilizing element 418 is adjustable in concert with lift control member 124 via pivot 417 and stabilizing control mechanism 419. The stabilizing element is placed such that a lift force $F_{L3}$ resulting from lift acting on the stabilizing element 418 is acting on the craft 400 behind the vertical projection of its center of gravity 150 in order to balance together with the lift force $F_{L1}$ the gravitational force G of the craft 400, as shown in FIG. 6b. In this configuration, employment of the stabilizing element 418 enables the design of a tailless craft with rudders 420 mounted to the deck structure 102, as illustrated in FIG. 6c. Optionally, the rudders are obviated by pivotally mounting propulsion means 412 to propulsion support structure 410 for enabling yaw control by pivotally moving the propulsion means 412. Further optionally, the stabilizing element 418 is replaced by independently movable left and right stabilizing elements for providing roll control of the craft 400. The craft 400 provides a more compact structure, which is easier to transport by obviating the tail structure. However, eliminating the elevator results in a reduction of maneuverability as well as stability of the craft 400, thus, reducing the range of operation over uneven ground, choppy water surfaces, as well as speed.

Further optionally, the tail structure as well as the stabilizing element are obviated resulting in a craft controlled only by the lift control member and the rudder or, alternatively, the pivotally movable propulsion means. This results in a very simple structure of limited operational range for use as, for example, a pleasure watercraft which is simple in construction, simple in operation, easily transported, and easily launched from a beach or boat launch.

Preferably, the pontoons 104 of the various embodiments of the surface effect craft according to an embodiment of the invention comprise a rigid body with a bottom surface shaped such that during operation airflow is directed under at least a portion of the pontoons providing additional lift. Alternatively, the pontoons comprise an inflatable body. However, employment of inflatable pontoons limits the use of the amphibious surface effect craft over uneven ground and is considered an option when the craft is mostly used over water surfaces and space for transporting the craft limited. Optionally, in order to minimize the width of the craft during transport, the floats 104 are removable attached to the deck structure 102 using, for example, a quick release system.

Figure 7:
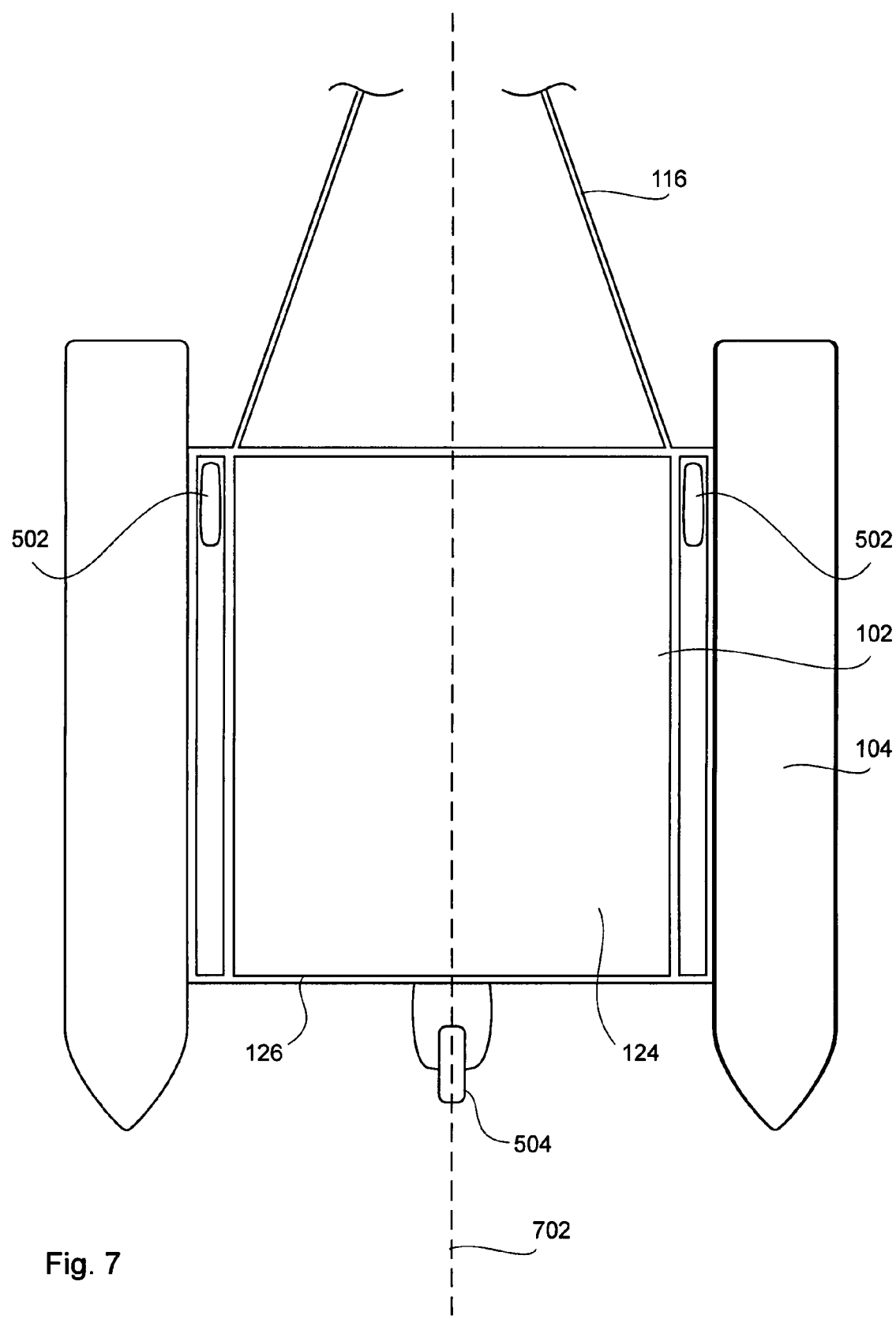
FIG. 7 is a simplified block diagram illustrating a bottom view of another embodiment of the amphibious surface effect craft according to an embodiment of the invention comprising a landing gear.

Further optionally, the various embodiments of the surface effect craft according to an embodiment of the invention comprise a retractable tricycle-type landing gear with two rear wheels 502 and a front wheel 504, as shown in FIG. 7. Preferably, the two rear wheels 502 are retractably mounted to the deck structure 102 such that they are disposed—when in "down position"—behind and in proximity to the vertical projection of the center of mass. In a preferred embodiment, the retractable landing gear comprises a steerable front wheel 504 and is designed such that the wheels 502 and 504 are disposed—when in "down position"—below the bottom surface of the pontoons 104 at a distance sufficient to enable the craft to climb over obstacles at low speed. For example, with the landing gear being adjustable to provide a distance in a range of approximately 0" to 24" enables the craft to climb a wide range of obstacles. Another application of the landing gear is during high-speed travel over ground. With the front wheel 504 raised after surface effect takes place the craft travels on the two rear wheels 502 with the distance to ground adjusted appropriately—in a range for the surface effect to take place but to, protect the pontoons from hitting obstacles. In this mode of travel pitch of the craft are controlled using the elevator 118 and the lift control member 124 while the direction is controlled using the rudder 120. Employment of the lift control member 124 in this mode of travel is highly advantageous by enabling the pilot to adjust the lift to various ground conditions. The amphibious surface effect craft in this mode of travel over ground is highly advantageous for traveling in areas not accessible to land crafts as well as water crafts such as tundra, partially frozen lakes and rivers. Optionally, the wheels are replaced with skis for travel over snow and ice surfaces. Further applications of the landing gear are used during travel over or on a water surface. Deployment of the rear wheels 502 to interact with the water surface in concert with the lift control member 124 adjusted in the second position for producing negative lift provides powerful means for gently or—in an emergency—abruptly slowing down the craft. As is evident, the capability of abruptly slowing down the craft substantially increases safety. Maneuverability of the craft during low speed travel on a water surface is increased by deploying the steerable front wheel 504 in the water for steering.

The above embodiments of the surface effect craft according to embodiments of the invention are highly versatile and are operational as amphibious crafts. Employment of the lift control member enables the craft to achieve surface effect at low speed and, furthermore, allows control of the aerodynamic lift in a wide range from maximum lift to negative lift. This substantially widens the operational range of the craft with respect to surface conditions—such as uneven ground, choppy water surfaces, snow, and ice—and speed. Furthermore, the capability of generating negative lift substantially enhances stability of the craft during travel over uneven ground, choppy water surfaces, and in turns, substantially increasing safety. Safety is also increased by the capability of the craft to slow down using the negative lift provided by the lift control member and—while traveling over water surfaces—the interaction of the rear wheels of the landing gear with the water. Despite its versatility the craft is simple in construction, simple to operate, easy to transport, and easy to deploy.

Further embodiments of the surface effect craft according to an embodiment of the invention include crafts for operation over only one of ground surface and water surface. For example, the surface effect craft shown in FIG. 7 is easily modified for operation over ground by replacing the pontoons 104 with guiding members. As the pontoons, the guiding members are disposed at the left hand side and the right hand side of the supporting deck structure 102 and are oriented substantially parallel to a longitudinal axis 702 of the supporting deck structure 102 and extending downward a predetermined distance from a bottom of the supporting deck structure 102 for channeling air under the bottom of the supporting deck structure 102 during forward movement of the surface effect craft. In the simplest form, the guiding members comprise a flat plate.

Figure 8:
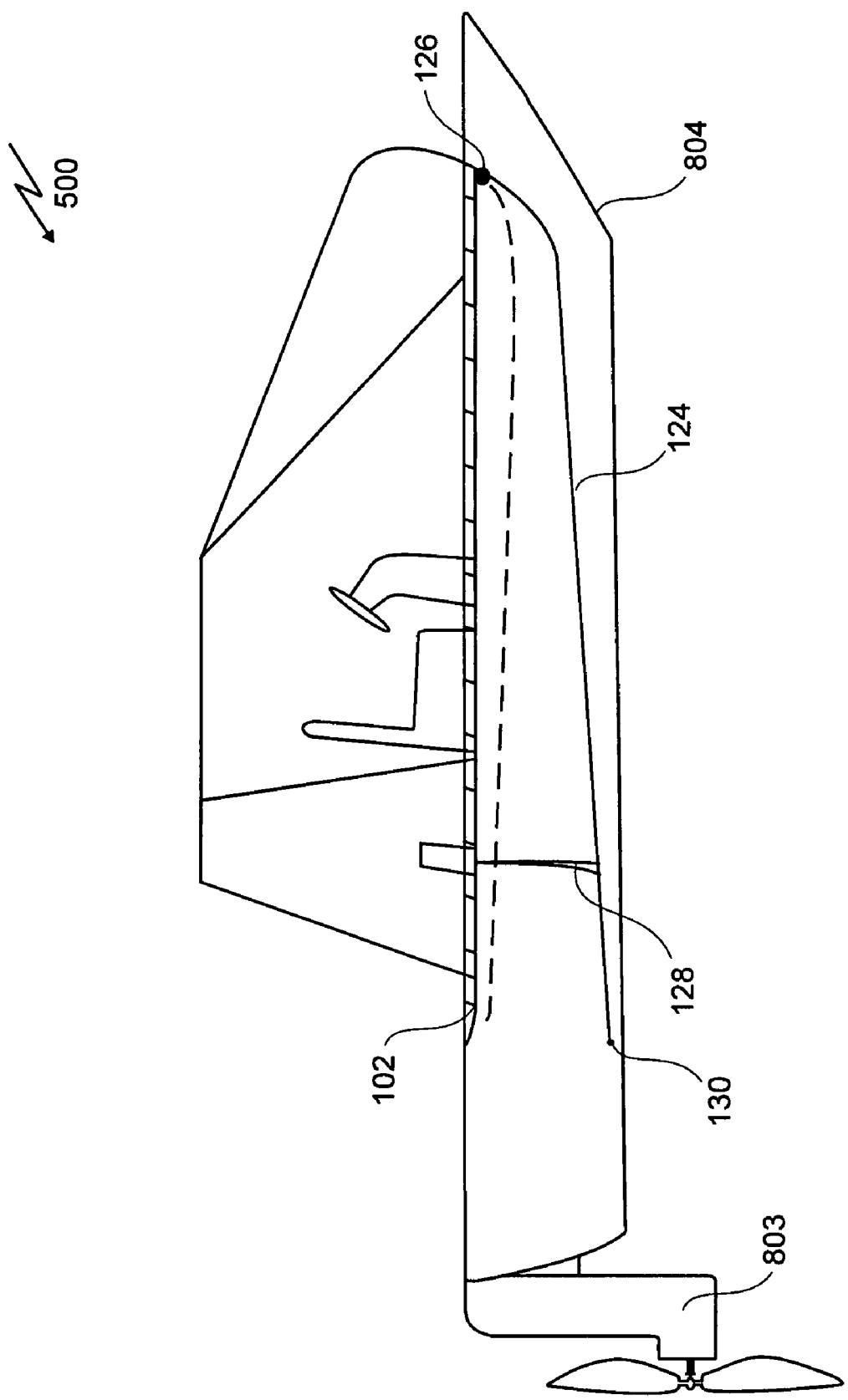
FIG. 8 is simplified block diagram schematically illustrating a cross sectional side view of a surface effect water craft according to an embodiment of the invention; and, FIGS. 9a and 9b are simplified block diagrams schematically illustrating a cross sectional side view and a front view, respectively, of another surface effect water craft according to an embodiment of the invention.

Referring to FIG. 8, a cross sectional view of a surface effect water craft 500 according to an embodiment of the invention is shown. The craft 500 comprises a supporting deck structure 102 connecting two floating members 804 such as boat hulls or pontoons in a catamaran like fashion.

A lift control member 124 is disposed under the deck structure 102 between the floating members 804 and pivotally mounted to a front portion 126 of the deck structure 102. The lift control member 124 is movably attached at its rear portion to the deck structure 102 via lift control mechanism 128 such that in operation the lift control member 124 is controllably movable from a first position—with its trailing edge 130 being in close proximity to a water surface—to a second position—with the trailing edge 130 being in close proximity to a bottom surface of the deck structure 102. Mounted to a rear portion of the floating members 804 is propulsion mechanism 803 for providing forward propulsion. Steering is enabled by pivotally moving the propulsion mechanism 803 or, alternatively, using a rudder. In one embodiment the craft 500 is designed for cruise operation with only a portion of the propulsion mechanism 803 immersed in the water. Alternatively, the craft 500 is designed for cruise operation having a rear portion of the floating members 803 immersed in the water. Optionally, the craft 500 comprises a left hand side and a right hand side lift control member, which are individually adjustable for roll control of the craft 500. This is beneficial, for example, during narrow turns or on rough seas. Further optionally, the lift control member 124 has at its trailing end a stabilizing element pivotally movable attached thereto.

Figure 9A:
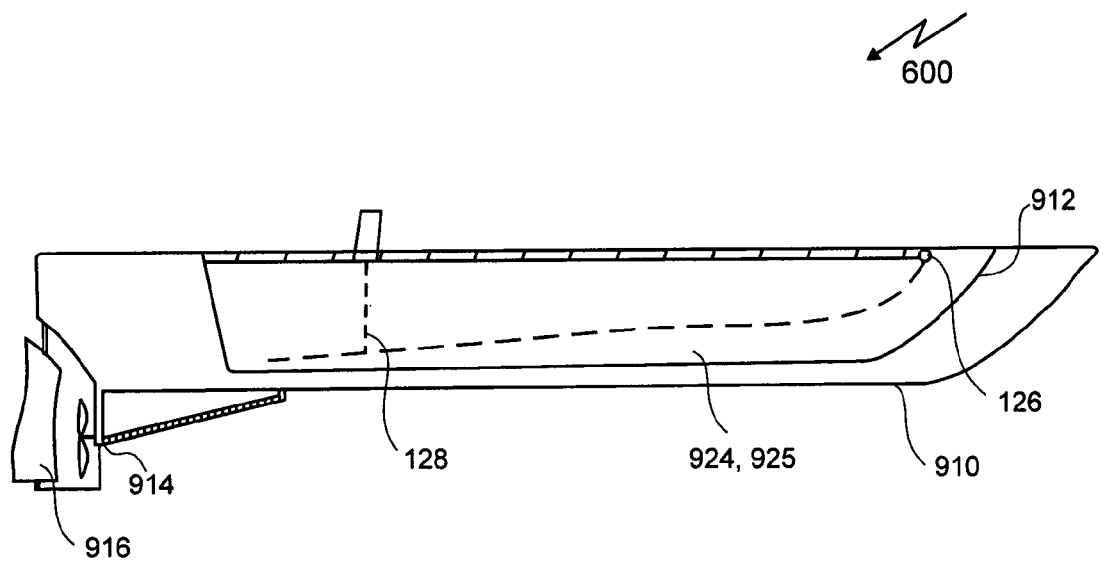
Figure 9B:
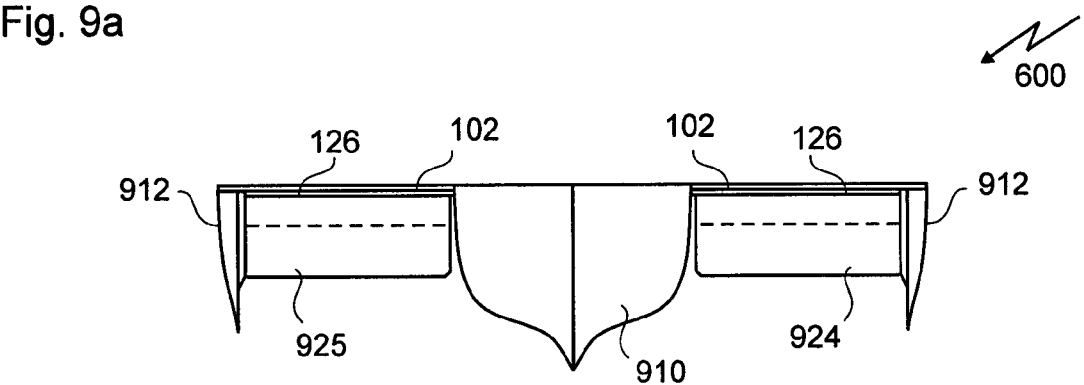

Referring to FIGS. 9a and 9b, a cross-sectional view and a front view of another embodiment of a surface effect water craft 600 according to an embodiment of the invention is shown. The craft 600 comprises a supporting deck structure 102 connected to a floating member 910 such as a boat hull. Mounted to a rear portion of the floating member 910 is propulsion mechanism 914. Steering is enabled using rudder 916 or, alternatively, by pivotally moving a portion of the propulsion mechanism 914. A first and a second guiding member 912 are connected to the supporting deck structure 102, respectively. The first and the second guiding member 912 are oriented parallel to a longitudinal axis of the craft 600 and extend downward a predetermined distance for channeling air under a left hand portion and a right hand portion of the supporting deck structure 102, respectively, during forward movement of the craft 600. In the simplest form, the first and the second guiding member 912 comprise a flat plate. A first lift control member 924 is disposed under the left hand portion of the supporting deck structure 102 between the first guiding member 912 and the floating member 910 and a second lift control member 925 is disposed under the right hand portion of the supporting deck structure 102 between the second guiding member 912 and the floating member 910. The first and the second lift control member 924 and 925 are movable between a first position with the rear end of the lift control member being at a maximum distance to the bottom of the supporting deck structure 102 and a second position with the rear end of the lift control member being at a minimum distance to the bottom of the supporting deck structure 102 using lift adjust mechanism 128. Preferably, the first and the second lift control member 924 and 925 are individually adjustable for roll control of the craft 600.

The surface effect water craft 500 and 600 according to an embodiment of the invention are highly advantageous for high speed water transportation by achieving aerodynamic lift at relatively low speed, enabling lift adjustment in a wide operational range, and enabling relatively simple operation.

Numerous other embodiments of the invention will be apparent to persons skilled in the art without departing from the spirit and scope of the invention as defined in the appended claims.

What is claimed is:

1. A surface effect craft comprising:
   a supporting deck structure;
   a propulsion mechanism in mechanical communication with the supporting deck structure for providing forward movement of the surface effect craft;
   a first and a second guiding member disposed at a left hand side and a right hand side of the supporting deck structure, respectively, and in mechanical communication therewith,
   the first and the second guiding member being oriented substantially parallel to a longitudinal axis of the supporting deck structure and extending downward a predetermined distance from a bottom of the supporting deck structure for channeling air under the bottom of the supporting deck structure during forward movement of the surface effect craft;
   a lift adjust mechanism in mechanical communication with the supporting deck structure;
   a single lift control member disposed under the supporting deck structure between the first and the second guiding member, the lift control member being pivotally movable mounted to a front portion of the supporting deck structure and extending along at least half the length of the supporting deck structure, the lift control member being movable between a first position with the rear end of the lift control member being at a maximum distance to the bottom of the supporting deck structure and a second position with the rear end of the lift control member being at a minimum distance to the bottom of the supporting deck structure for controllably interacting via its bottom side with the channeled air, the lift adjust mechanism for pivotally moving the lift control member.

2. A surface effect craft as defined in claim 1 wherein the bottom side of the lift control member comprises a flat surface facing the channeled air.

3. A surface effect craft as defined in claim 2 wherein the bottom side of the lift control member comprises a second flat surface facing the channeled air, the second flat surface being disposed at a predetermined angle to the first surface.

4. A surface effect craft as defined in claim 2 wherein the bottom side of the lift control member comprises a front portion having a convex curved surface facing the channeled air.

5. A surface effect craft as defined in claim 1 wherein the bottom side of the lift control member comprises a front portion having a convex curved surface facing channeled air and a rear portion having a concave curved surface facing the channeled air.

6. A surface effect craft as defined in claim 1 comprising a sensor for automatically adjusting the lift control member.

7. A surface effect craft as defined in claim 1 wherein a rear portion of the lift control member is pivotally movable with respect to a front portion of the lift control member.

8. A surface effect craft as defined in claim 1 comprising a steering mechanism in mechanical communication with the supporting deck structure.

9. A surface effect craft as defined in claim 8 wherein the steering mechanism comprises at least a rudder.

10. A surface effect craft as defined in claim 8 comprising an elevator mechanism in mechanical communication with the supporting deck structure.

11. A surface effect craft as defined in claim 10 wherein the elevator mechanism is disposed such that a fluid stream generated by the propulsion mechanism is acting on the same.

12. A surface effect craft as defined in claim 1 wherein each of the first and the second guiding member comprises a floating member.

13. A surface effect craft as defined in claim 12 wherein each of the floating members comprises a bottom surface shaped such that during forward movement of the surface effect craft air is guided under at least a portion of the floating member.

14. A surface effect craft as defined in claim 1 comprising a tricycle type landing gear in mechanical communication with the supporting deck structure, the tricycle type landing gear comprising a steerable front member.

15. A surface effect craft as defined in claim 1 wherein the lift control member extends along approximately the length of the supporting deck structure.

16. A surface effect craft comprising:
a supporting deck structure;
a floating member disposed at a center of the supporting deck structure and in mechanical communication therewith, the floating member being oriented substantially parallel to a longitudinal axis of the supporting deck structure and extending downward from a bottom of the supporting deck structure;
a propulsion mechanism mounted to a rear portion of the floating member for providing forward movement of the surface effect craft;
a first and a second guiding member disposed at a left hand side and a right hand side of the supporting deck structure, respectively, and in mechanical communication therewith, the first and the second guiding member being oriented substantially parallel to a longitudinal axis of the supporting deck structure and extending downward a predetermined distance from the bottom of the supporting deck structure, the first and the second guiding member for channeling air under a left hand portion and a right hand portion of the bottom of the supporting deck structure, respectively, during forward movement of the surface effect craft;
a single left hand side lift control member disposed under the left hand portion of the supporting deck structure between the first guiding member and the floating member and a single right hand side lift control member disposed under the right hand portion of the supporting deck structure between the second guiding member and the floating member, the left hand side and the right hand side lift control member each having a front end pivotally movable mounted to a front portion of the supporting deck structure and a rear end disposed in proximity to a rear portion of the supporting deck structure and extending along at least half the length of the supporting deck structure, the left hand side and the right hand side lift control member each being movable between a first position with the rear end of the lift control member being at a maximum distance to the bottom of the supporting deck structure and a second position with the rear end of the lift control member being at a minimum distance to the bottom of the supporting deck structure for controllably interacting via its bottom side with the channeled air for controllably providing a substantial portion of lift acting on the surface effect craft during forward movement; and,
a lift adjust mechanism in mechanical communication with the supporting deck structure and the left hand side and the right hand side lift control member for pivotally moving the left hand side and the right hand side lift control member.

17. A surface effect craft as defined in claim 16 wherein the left hand side and the right hand side lift control members are individually adjustable.

18. A surface effect craft as defined in claim 16 wherein the left hand side lift control member and the right hand side lift control member each extend along approximately the length of the supporting deck structure.

19. A surface effect craft comprising:
a supporting deck structure;
an aerodynamic propulsion mechanism mounted to the supporting deck structure for providing forward movement;
two pontoons mounted to the supporting deck structure in catamaran like fashion;
a tail structure comprising an elevator and a rudder mounted to a rear portion of the deck structure with the elevator being disposed such that an air stream generated by the aerodynamic propulsion mechanism is acting on the same;
a single lift control member disposed under the supporting deck structure between the two pontoons, the lift control member being pivotally movable mounted to a front portion of the supporting deck structure and extending along at least half the length of the supporting deck structure, the lift control member being movable between a first position with the rear end of the lift control member being at a maximum distance to the bottom of the supporting deck structure and a second position with the rear end of the lift control member being at a minimum distance to the bottom of the supporting deck structure for controllably interacting via its bottom side with the channeled air for controllably providing a substantial portion of lift acting on the surface effect craft during forward movement; and,
a lift adjust mechanism in mechanical communication with the supporting deck structure and the lift control member for pivotally moving the lift control member.

20. A surface effect craft as defined in claim 19 comprising a retractable landing gear.

21. A surface effect craft as defined in claim 20 wherein the landing gear comprises a tricycle type landing gear with a steerable front member.

22. A surface effect craft comprising:
a supporting deck structure;
a propulsion mechanism in mechanical communication with the supporting deck structure for providing forward movement of the surface effect craft;
a first and a second guiding member disposed at a left hand side and a right hand side of the supporting deck structure, respectively, and in mechanical communication therewith, the first and the second guiding member being oriented substantially parallel to a longitudinal axis of the supporting deck structure and extending downward a predetermined distance from a bottom of the supporting deck structure for channeling air under the bottom of the supporting deck structure during forward movement of the surface effect craft;
a single left hand side lift control member disposed under a left hand portion of the supporting deck structure between the first guiding member and a center of the supporting deck structure and a single right hand side lift control member disposed under a right hand portion of the supporting deck structure between the second guiding member and the center of the supporting deck structure, the left hand side and the right hand side lift control member each having a front end pivotally movable mounted to a front portion of the supporting deck structure and a rear end disposed in proximity to a rear portion of the supporting deck structure and extending along at least half the length of the supporting deck structure, the left hand side and the right hand side lift control member each being movable between a first position with the rear end of the lift control member being at a maximum distance to the bottom of the supporting deck structure and a second position with the rear end of the lift control member being at a minimum distance to the bottom of the supporting deck structure for controllably interacting via its bottom side with the channeled air for controllably providing a substantial portion of lift acting on the surface effect craft during forward movement; and, a lift adjust mechanism in mechanical communication with the supporting deck structure and the left hand side and the right hand side lift control member for pivotally moving the left hand side and the right hand side lift control member.

23. A surface effect craft as defined in claim 22 wherein each of the first and the second guiding member comprises a floating member.

24. A surface effect craft as defined in claim 22 wherein the left hand side and the right hand side lift control members are individually adjustable.

25. A surface effect craft as defined in claim 22 comprising a third guiding member disposed at the center of the supporting deck structure and in mechanical communication therewith, the third guiding member being oriented substantially parallel to the longitudinal axis of the supporting deck structure and extending downward from the bottom of the supporting deck structure.

26. A surface effect craft as defined in claim 25 wherein the third guiding member comprises a floating member.

27. A surface effect craft as defined in claim 22 wherein the left hand side lift control member and the right hand side lift control member each extend along approximately the length of the supporting deck structure.

* * * * *